Feb. 6, 1951  M. C. KESSLER, JR  2,540,953
PLASTIC LENS AND GUARD
Filed Sept. 16, 1946

Inventor
Martin C. Kessler, Jr
By H. Hamlin Hodges
Attorney

Patented Feb. 6, 1951

2,540,953

UNITED STATES PATENT OFFICE 2,540,953

PLASTIC LENS AND GUARD

Martin C. Kessler, Jr., Detroit, Mich.

Application September 16, 1946, Serial No. 697,184

1 Claim. (Cl. 88—57)

In recent years, it has become generally known that optical lenses of varying types can be made, having any desired dioptral power, of plastic material. Furthermore, these lenses are, generally speaking, considerably lighter than a lens of equal dioptral power made of glass which has been properly ground.

A fundamental difficulty with plastic lenses is that the plastic material of which they are made is relatively soft, and may be inadvertently scratched and consequently its value as a clear lens is often diminished relatively soon after the lens has been placed into service.

An object of my invention is to provide a plastic lens which may be protected from scratching or the like by the use of a thin covering of hard transparent material.

A further object is to provide a plastic lens over which a hard surfaced transparent material may be positioned either in contact with or spaced apart from the plastic lens.

A further object is to provide a plastic lens having a cover of a hard transparent material which may be cemented or molded into position to protect the surface of the plastic lens.

Figure 1:
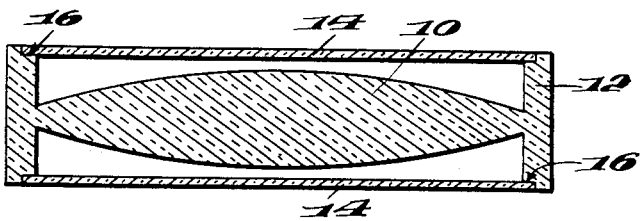
Fig. 1 is a vertical cross-section of a plastic lens having hard transparent plates spaced apart over the surfaces of the lens.

In producing plastic lenses, a mold is provided and is designed so that a lens 10 may be molded of a clear, plastic material which will produce a lens of a desired dioptral power. In following my invention a mold is formed to provide edge pieces 12, molded integrally with a lens having sides extending outwardly beyond the thickness of the lens 10. These side or edge pieces 12 may be made in the form of a circle or rim around the periphery of the lens 10, or they may be made in any desired shape to provide a rim around the entire lens and spaced apart from the faces of the lens to support a transparent hard surfaced material such as glass or the like 14. In the form disclosed in Fig. 1, the glass or other hard surfaced transparent material 14 is preferably cemented to the side piece 12 fitting snugly within a groove 16 cut in the edge pieces. It will be understood, of course, that the cement used to position a glass or transparent plate 14 in the groove 16 will preferably be a transparent cement.

In the above described manner, the hard surfaced transparent plates 14 are cemented to the edge pieces 12, formed integrally with the lens 10, in such position that the transparent plates are spaced apart from the lens surfaces and do not contact the lens at any point. In this manner a lens 10 of desired dioptric power may be molded, and by cementing over the surface thereof a hard transparent material spaced apart from the lens, the lens 10 may retain its dioptral power for an indefinite length of time and will not become scratched by any hard or sharp instrument bearing against the surface of the finished product.

Figure 2:
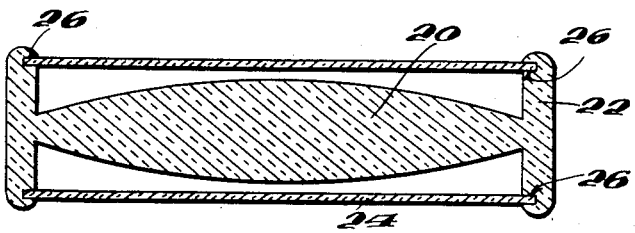
Fig. 2 is a vertical cross-section of a modified form of a plastic lens having hard transparent plates spaced apart over the surfaces of the lens.

In the modified form of lens shown in Fig. 2, a lens 20 is provided in the same manner as the lens 10 referred to above, but in this modified form the edge pieces or rims 22, molded with the lens 20, are preferably provided with scorings 26 into which suitable hard surfaced plates 24 may be inserted.

During the insertion of the plates 24, the rims or edge pieces 22 are heated to a desired temperature so that they are made pliable and may be conveniently placed over the edge surfaces of the plate 24 and subsequently, while still heated, may be pressed therearound to hold the plate 24 in its adjusted position. In this manner, the edge pieces 22 may securely hold the hard surfaced plates 24 in their position by a knurling process.

Figure 3:
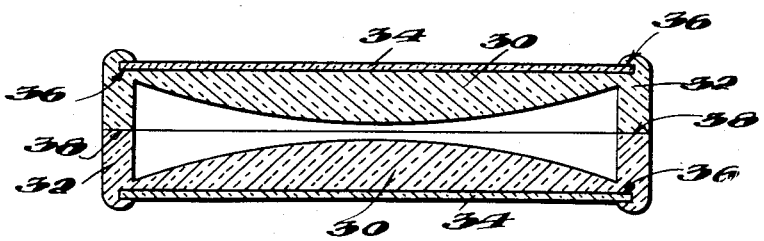
Fig. 3 is a vertical cross-section of a condenser type plastic lens having a hard finish transparent plate cemented to a flat surface thereof.

In the modified form disclosed in Fig. 3, the plastic lens 30 therein disclosed is designed to be in the form of a condenser type of lens, namely having one flat surface and one convex surface (a plano-convex lens). Preferably two condenser lenses 30 are produced, and each lens 30 is provided with a peripheral binding 32 molded integrally with the lens. In producing this form of lens, I preferably provide grooves 36 in the peripheral binding 32 so that the edges of the hard surfaced plate 34 may be inserted therein. The insertion of the plate 34 is made in the grooves 36 of the peripheral binding 32 in the same manner as described above with reference to Fig. 2; but in addition to this form of binding, the hard surfaced plate 34 is preferably cemented, by the use of a transparent cement, on the plano surface of the lens 30.

It will be understood that it may be found preferable to provide a groove in the peripheral binding 32, as disclosed in Fig. 1, so that the plate 34 may be cemented to the plano surface of the lens 30 and to the binding 32 in one operation.

After two of these condenser type lenses have been produced as described above, they may be cemented together to produce lenses as disclosed in Fig. 3, by the use of any desired form of cement placed on flat surfaces 38 provided on the peripheral binding 32. By thus cementing two bindings together, with their associated lenses 30 and hard surfaced transparent plates 34, a guarded lens will be produced, as disclosed in Fig. 3.

In this construction of lens, it will be obvious that there will be an air space provided between the convex surfaces of the lens 30, and on the plano surface thereof suitable hard surfaced transparent plates 34 will be cemented to prevent the lens 30 from being scratched.

It will be understood that by the use of my construction, the hard surfaced transparent plates 14, 24 and 34 will be so held over the dioptral power portions 10, 20 and 30, respectively, no dirt, moisture or other foreign objects may contact the surface of the lens.

I claim:

A plurality of plano-convex molded lenses, a peripheral rim molded with the said plano-convex lenses, grooves near the edge of said rim, hard transparent plates secured to the plano surface of the lenses and held by the said grooves, and means securing said lenses in spaced-apart positions having their convex surfaces remote from the said hard transparent plates.

MARTIN C. KESSLER, Jr.

REFERENCES CITED

The following references are of record in the file of this patent:

UNITED STATES PATENTS

| Number | Name | Date |
|---|---|---|
| 859,215 | Guilbert | July 9, 1907 |
| 2,056,693 | Stanley | Oct. 6, 1936 |
| 2,088,262 | Grano | July 27, 1937 |
| 2,314,838 | Kingston | Mar. 23, 1943 |
| 2,330,663 | Bennett et al. | Sept. 28, 1943 |
| 2,332,930 | Rinia | Oct. 26, 1943 |
| 2,346,002 | Bennett et al. | Apr. 4, 1944 |
| 2,361,589 | Bennett et al. | Oct. 31, 1944 |

FOREIGN PATENTS

| Number | Country | Date |
|---|---|---|
| 490,381 | Great Britain | Aug. 15, 1938 |